Figures 1, 5:
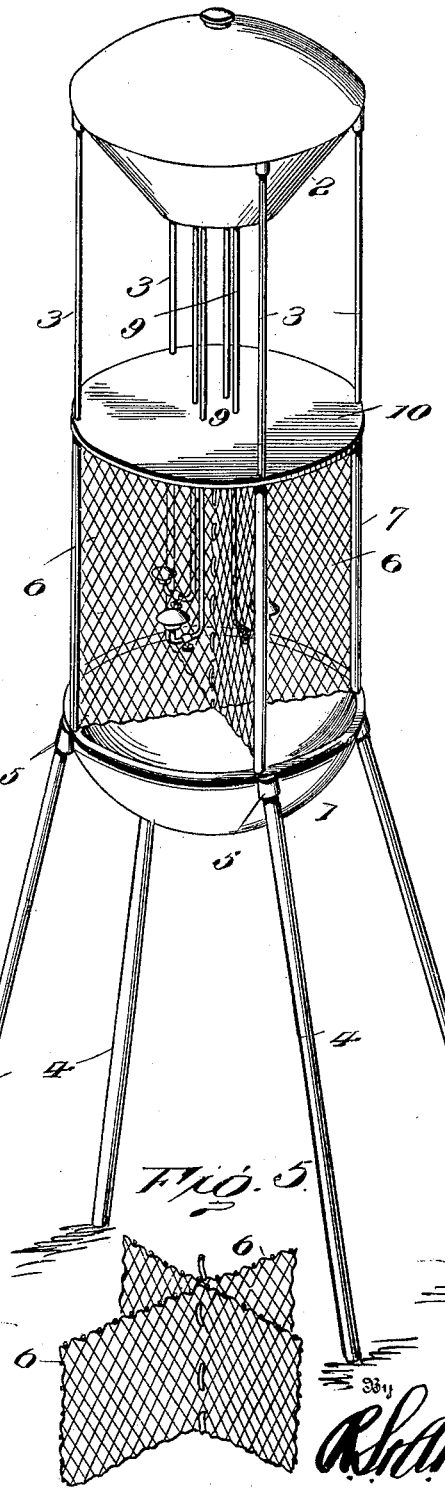

No. 681,859. Patented Sept. 3, 1901.
N. A. POLLARD.
INSECT EXTERMINATOR.
(Application filed May 23, 1901.)
(No Model.) 2 Sheets—Sheet 1.

Witnesses
Inventor
N. A. Pollard

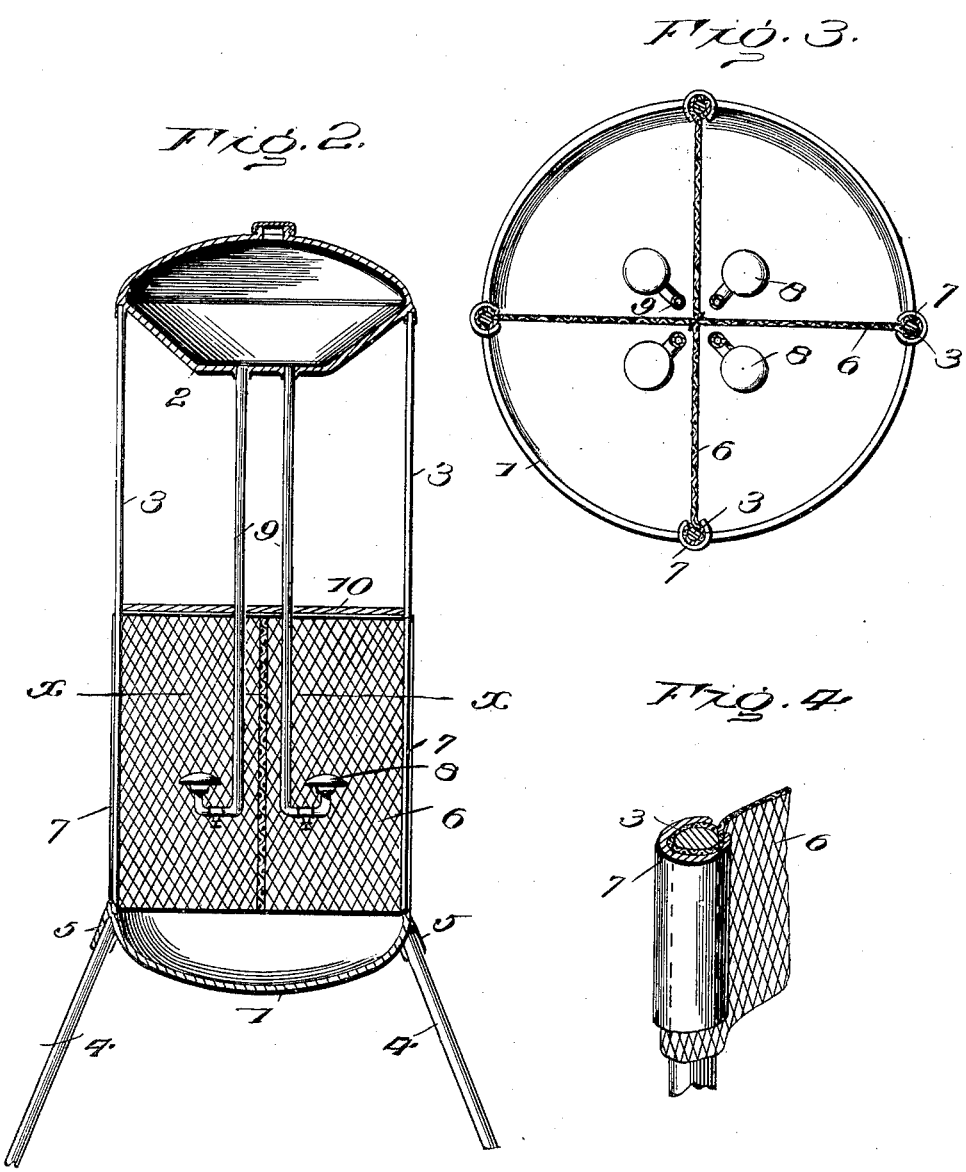

UNITED STATES PATENT OFFICE.

NORVEL A. POLLARD, OF SHEPPARDS, VIRGINIA.

INSECT-EXTERMINATOR.

SPECIFICATION forming part of Letters Patent No. 681,859, dated September 3, 1901.

Application filed May 23, 1901. Serial No. 61,608. (No model.)

*To all whom it may concern:*

Be it known that I, NORVEL A. POLLARD, a citizen of the United States, residing at Sheppards, in the county of Buckingham and State of Virginia, have invented certain new and useful Improvements in Insect-Exterminators; and I do hereby declare the following to be a full, clear, and exact description of the invention, such as will enable others skilled in the art to which it appertains to make and use the same.

This invention provides novel and effective means for destroying the tobacco-fly and kindred insects which are destructive to plants and create havoc among growing crops, thereby materially lessening the harvest or detracting from its marketable value.

It is well known that insects are attracted at night by a light and endeavor to pass through the same. Hence the common practice of placing lighted torches in the fields for destruction of the pests. This practice is not entirely satisfactory, as many of the insects are only disabled and collect in the vicinity of the torches and feed upon the plants.

This invention provides means for killing the disabled insects and insuring the destruction of such as are attracted to the device by means of the light.

Generally stated, the exterminator consists of a series of wings radiating from a common line, burners located in the angular space formed between adjacent wings, and a basin arranged below the wings and holding a quantity of gasolene or other liquid insecticide for killing such insects as are disabled by the flame or otherwise enter the bath.

For a full description of the invention and the merits thereof and also to acquire a knowledge of the details of construction of the means for effecting the results reference is to be had to the following description and drawings hereto attached.

While the essential and characteristic features of the invention are necessarily susceptible of modification, still the preferred embodiment of the invention is illustrated in the accompanying drawings, in which—

Figure 1 is a perspective view of the exterminator constructed in accordance with the principles of this invention. Fig. 2 is a vertical central section thereof. Fig. 3 is a horizontal section on the line X X of Fig. 2. Fig. 4 is a detail view showing the manner of protecting the outer edge of the wings and connecting them to the vertical rods of the frame. Fig. 5 is a detail view in perspective showing the manner of connecting the pieces forming the wings.

Corresponding and like parts are referred to in the following description and indicated in all the views of the drawings by the same reference characters.

The exterminator in its organization comprises a basin 1, a reservoir 2, and a series of rods 3, connecting the basin and reservoir. The reservoir 2 constitutes a fount for holding a supply of gasolene or other hydrocarbon for replenishing the burners when the exterminator is in active operation.

The device is preferably mounted upon legs 4, which are fitted into sockets 5, secured to the sides of the basin 1.

In order to trap the insects, wings 6 are provided and located immediately above the basin 1 and radiating from a common line which coincides approximately with the vertical center of the device. The wings are formed, preferably, of wire-cloth, so as not to obstruct the rays of light from any of the burners, thereby admitting of the flame of each burner being seen from any point of view, the combined light being more searching and attracting greater attention. The wings are attached at their outer edges to the rods 3, preferably by being bent or folded therearound, metal strips 7 being folded intermediate of their edges and fitted over the rods and bent edge portions of the wings and clenched upon the sides of the latter, so as to make a neat and secure joint. The wings are connected at the point of convergence. In the preferable construction two pieces of wire-cloth are secured together midway of their ends by interlacing a wire through the meshes, and the end portions upon opposite sides of the line or juncture are bent, thereby providing the wings, as clearly indicated. The lower ends of the wings terminate a short distance above the basin 1 and their top edge may reach to any desired height. A burner 8 is located in the angular space formed between adjacent wings and is connected with the reservoir 2 by means of a pipe 9. This burner may be of any type and is located near the lower ends of the wings, whereby the heat from the flame will be better enabled to destroy the insects entrapped by the wings. The reservoir 2 is located a safe distance above the burners, so as to avoid explosion, and greater safety is assured by locating a deflector 10 below the reservoir, and this deflector consists of metal lined upon its bottom side with asbestos or some refractory material.

When it is required to use the exterminator, it is placed in the field at the desired point and gasolene or other required insecticide is placed in the basin 1 and the burners 8 are ignited. The insects attracted by the light pass through the flame and such as are disabled fall into the basin and are killed by the insecticide, and such others as are caught in the angle between adjacent wings are either destroyed by the heat of the flame or are killed upon retracing their flight back through the flame. It will thus be seen that disabled insects drop into the basin and are killed and are thereby prevented from collecting in the vicinity of the exterminator.

Having thus described the invention, what is claimed as new is—

1. An insect-exterminator comprising a plurality of wings radiating from a vertical line, a basin below the wings, a reservoir above the said wings, burners connected with the reservoir and located in the angular spaces formed between adjacent wings, and a deflector above the wings and between the burners and the reservoir, substantially as described.

2. In an insect-exterminator, pieces of sheet material secured together midway of their ends and having the parts upon opposite sides of the line of juncture bent to provide radiating wings, and a burner located in the angular space formed between adjacent wings, substantially as set forth.

3. In an insect-exterminator, a basin, a reservoir located above the basin, rods connecting the basin and reservoir, radiating wings having their outer edge portions secured to the said rods, and burners pendent from the reservoir and located in the angular spaces formed between adjacent wings, substantially as set forth.

4. The herein-described insect-exterminator comprising a basin provided with sockets, legs fitted in the said sockets, a reservoir located above the basin, rods connecting the basin and reservoir, divergent wings secured at their outer edges to the said rods, and burners pendent from the reservoir and located in the angular spaces formed between adjacent wings, substantially as set forth.

In testimony whereof I affix my signature in presence of two witnesses.

NORVEL A. POLLARD. [L. S.]

Witnesses:
   GLADYS L. THOMPSON,
   GENEVIEVE MATTHEWS.